No. 665,365. Patented Jan. 1, 1901.
G. H. FERGUSON.
FRUIT CLEANING AND POLISHING MACHINE.
(Application filed Dec. 20, 1899.)
(No Model.)
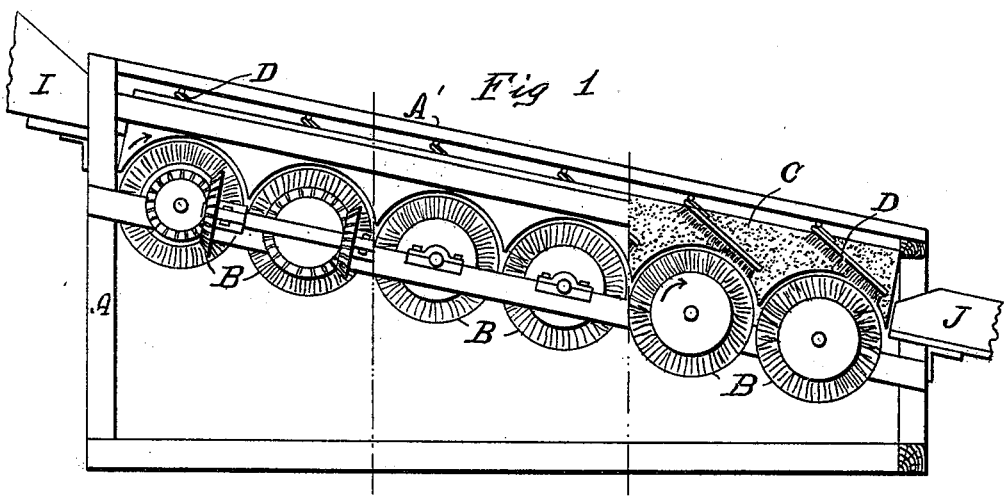
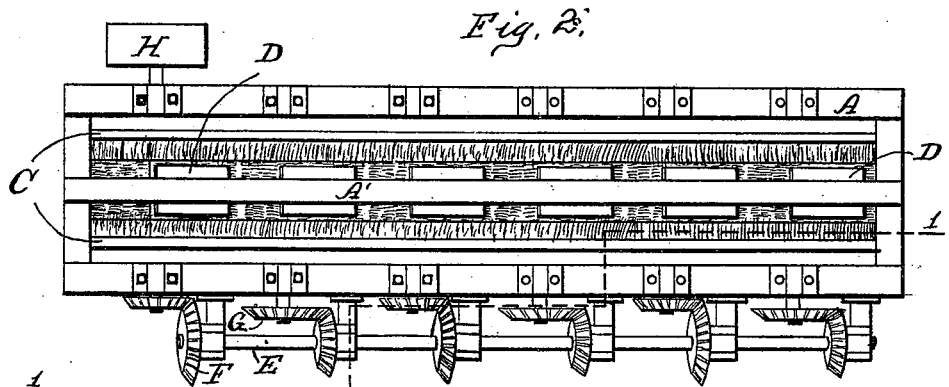
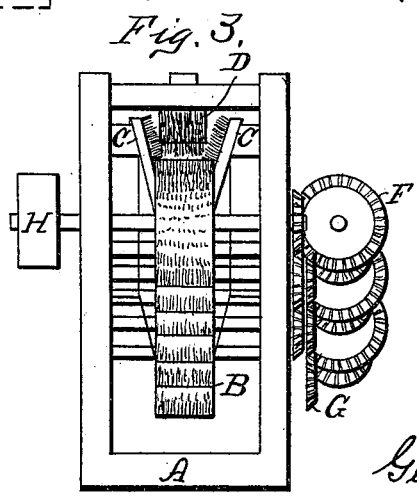
Witnesses,
M. C. Wilkinson
Matt McGinnis
Inventor
George H. Ferguson
by
Hazard & Harpham
Attorneys.

UNITED STATES PATENT OFFICE.

GEORGE H. FERGUSON, OF REDLANDS, CALIFORNIA, ASSIGNOR OF ONE-HALF TO ARTHUR GREGORY, OF SAME PLACE.

FRUIT CLEANING AND POLISHING MACHINE.

SPECIFICATION forming part of Letters Patent No. 665,365, dated January 1, 1901.

Application filed December 20, 1899. Serial No. 741,028. (No model.)

*To all whom it may concern:*

Be it known that I, GEORGE H. FERGUSON, a citizen of the United States, residing at Redlands, county of San Bernardino, State of California, have invented new and useful Improvements in Fruit Cleaning and Polishing Machines, of which the following is a specification.

My invention relates to improvements in machines for cleaning and polishing fruit, such as oranges, lemons, apples, and like fruit; and the object thereof is to provide a simple and efficient machine that will remove foreign substances—such as dust, smut, &c.—from the skin of the fruit and will make the skin glossy and bright. I accomplish this object by the mechanism described herein and illustrated in the accompanying drawings, forming a part hereof, in which—

Figure 1 is a side view, partly broken away, being broken on the line 1 1 of Fig. 2. Fig. 2 is a top plan view of my machine with the feed-hopper and discharge-spout removed. Fig. 3 is a front end view of my machine with the feed-hopper removed.

In the drawings, A represents the frame, in which, in suitable bearings on the side timbers thereof, are mounted brushes B, revolving in a vertical longitudinal plane. In the drawings I have shown six of these brushes, as I have found in practice that in cleaning and polishing oranges that number gives fine results; but the number may be increased or diminished as the fruit requires more or less cleaning and polishing.

C designates stationary side brushes, preferably extending from end to end of the machine on each side of the brushes B and are preferably set so as to form a trough, wider at the top than at the bottom, which is formed by the brushes B, to guide the fruit through the machine and to allow small fruit to fall into the narrow part and not pass through in a great number side by side, but pass one behind the other.

D represents top brushes hinged to a timber A' running through the center, so that the free end thereof may rise and fall as fruit of different sizes passes thereunder. In width these brushes are preferably as wide as the rotating brushes B and hang at an angle, with the free end thereof resting on the brushes B when there is no fruit in the machine.

E is a shaft rotatively mounted in bearings affixed to the side timbers of frame A, on which are mounted bevel gear-wheels F, which mesh with bevel gear-wheels G, mounted on the ends of the axles of the brushes B. These gear-wheels are preferably of two sizes, so as to give to the brushes B two different rates of speed—that is, to the odd-numbered brushes, as the first, third, &c., a higher rate of speed and to the even-numbered brushes, as the second, fourth, &c., a lower rate of speed. On the other end of the shaft of one of the brushes B, preferably the first, is a power-pulley H, from which motion is imparted to the brushes B, which all revolve in the same direction, as indicated by the arrows in Fig. 1.

I is the feed-hopper, and J is the discharge-spout.

My machine is operated as follows: Power is applied so as to give pulley H and brush G, on whose axle it is mounted, a speed of three hundred revolutions per minute. By means of the bevel-gears a somewhat slower speed of revolution is imparted to shaft E, which by means of the bevel-gears F thereon and the bevel-gears G on the ends of the shafts of the brushes H, the same being properly adjusted as to size, gives to the other odd-numbered brushes in the machine a speed of three hundred revolutions per minute, while to the even-numbered brushes a speed of only two hundred revolutions per minute is given. The fruit is fed into the machine through hopper I and is caused to move toward the discharge-spout J by the revolution of the brushes B. The speed at which the fruit will move through the machine is regulated very largely by the speed of the slower revolving brushes, thereby permitting of greater frictional contact with the brushes which are revolving at a higher rate of speed, and thus cleaning and polishing the fruit much more quickly than if the brushes all revolved at the same rate of speed. As the fruit is moved through the machine it also comes in contact with the side brushes C and the hanging brushes D. These hanging brushes keep the fruit in contact with the revolving brushes, and both the side brushes and the hanging brushes by their bristles help to remove impurities and to polish the skin of the fruit.

I have found that in cleaning and polishing oranges a brush may be used made with fiber bristles, the stiffness of which is determined by the toughness of the skin of the fruit handled. The fiber which I have used is medium quality.

Instead of side brushes plain sides could be used to guide the fruit over the revolving brushes, but it would not work as well, and for the hanging brushes a plain strip might be used, but that would not be as efficient as the hanging brushes, which not only keep the fruit in contact with the revolving brush, but also by their bristles aid to clean and polish the fruit. The vertically-revolving brushes could be rotated by means of sprocket wheels and chains.

Having described my invention, what I claim is—

1. A fruit cleaning and polishing machine, comprising a frame; a plurality of brushes revolving in the same direction in a vertical longitudinal plane, the alternate brushes having different rates of speed, mounted in said frame; a trough comprising suitable sides, and a bottom formed by said revolving brushes, adapted to guide the fruit through the machine; a hanging brush or plate over each revolving brush, adapted to keep the fruit in contact with the revolving brush on a part of its revolution, and means to cause the rotation of the brushes forming the bottom of the trough.

2. A fruit cleaning and polishing machine, comprising frame A; brushes B, revolving in a vertical longitudinal plane, the alternate brushes having different rates of speed, mounted therein; side brushes C forming the sides of the trough, adapted to guide the fruit through the machine; oblique hanging brushes D over brushes B; means to operate brushes B; feed-hopper I and discharge-spout J, substantially as described herein.

In witness that I claim the foregoing I have hereunto subscribed my name this 9th day of December, 1899.

GEORGE H. FERGUSON.

Witnesses:
CHAS. E. TRUESDELL,
A. GREGORY.